Figure 1:
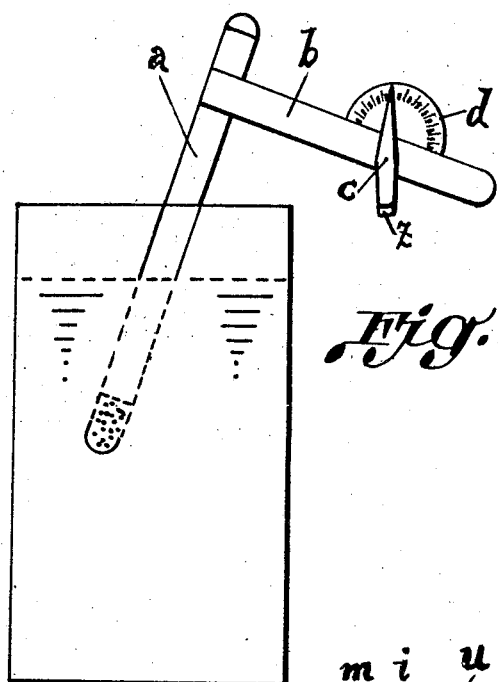

Feb. 21, 1933.  R. SCHRÖDER  1,898,903
HYDROMETER
Filed Sept. 5, 1929   2 Sheets-Sheet 1

Fig. 4ª.

INVENTOR
RICHARD SCHRÖDER
BY Joseph Hirschman
ATTORNEY

Feb. 21, 1933.   R. SCHRÖDER   1,898,903
HYDROMETER
Filed Sept. 5, 1929   2 Sheets-Sheet 2
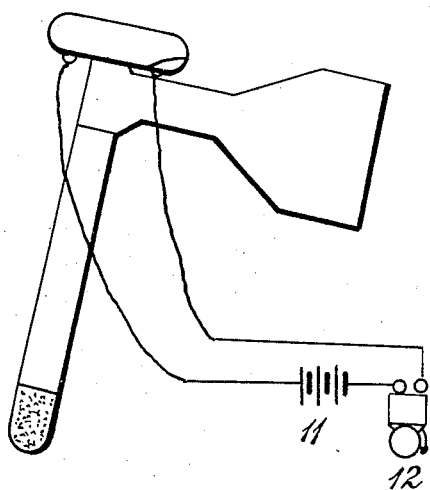
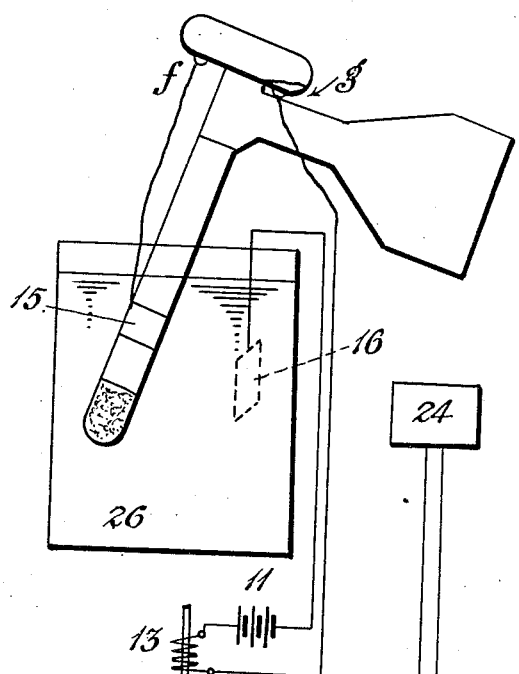
INVENTOR
RICHARD SCHRÖDER
BY
Joseph Hirschman
ATTORNEY Patented Feb. 21, 1933

1,898,903

UNITED STATES PATENT OFFICE

RICHARD SCHRÖDER, OF BERLIN, GERMANY

HYDROMETER

Application filed September 5, 1929, Serial No. 390,484, and in Germany February 27, 1928.

Application has been filed in Germany February 27, 1928.

My invention relates to measuring instruments, and particularly to the class of instruments adapted to measure the viscosity or specific gravity of liquids and commonly known as a hydrometer.

It is an object of the present invention to provide a hydrometer of novel construction provided with devices whereby the specific gravity of a liquid may be ascertained either at the situs of such liquid or at a distant point, and in general one which can be read at a distance from the surface of the liquid.

It is also an object of the present invention to provide a hydrometer capable of controlling charging or feeding elements in response to variations in the density of the liquid being tested.

Other objects and advantages of the present invention will be apparent from the following description and the features of novelty will be pointed out in the claims.

In carrying out my invention, a hydrometer of known type is provided with an arm at its upper end, so that when the hydrometer is in position immersed in the liquid it will tilt or be inclined to the vertical. Upon this arm is mounted a measuring apparatus adapted to be positioned externally and independently of the liquid surface. The measuring apparatus may comprise a scale mounted on the arm with which cooperates a weighted pivoted pendulum. The pendulum is provided with a pointer which indicates the angle of inclination of the hydrometer, such angle being proportional to the density of the liquid.

The arm with the scale thereon can be made to extend any reasonable convenient distance above the surface of the liquid being tested, or it may even be made to project over the edge of the vessel containing such liquid. By suitably dimensioning the float, the arm and the scale and pointer, any desired degree of accuracy, sensitivity, and transformation ratio can be attained.

The several parts of any improved hydrometer may be made of any desired materials, except that, when necessary, resistance to acids, heat and fire proofness, etc. must be taken into consideration. The indicating device may be encased, and may assume any of the forms common for such device; it may, for instance, be so constructed that the values can be read off from above.

My improved hydrometer may also be provided with contacts or switches of any suitable type which are made or broken at predetermined inclinations of the hydrometer corresponding to definite densities. These contacts or switches may be made to control electric circuits connected to a measuring instrument or to a controlling or feeding element, such as a valve or pump which feeds liquid into a mixing vessel, fuel to a burner or furnace, etc.

Figure 2:
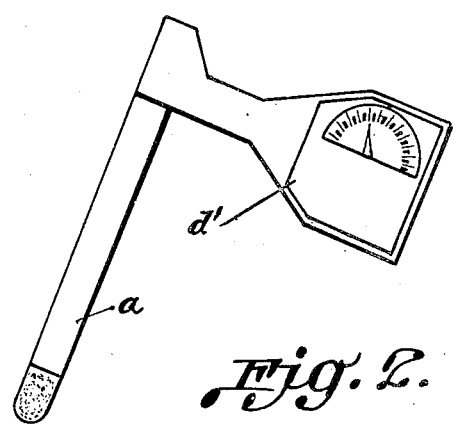
Figure 4:
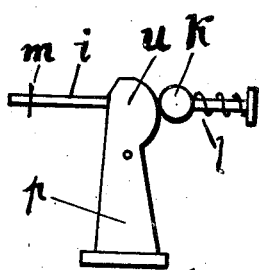
Figure 4:
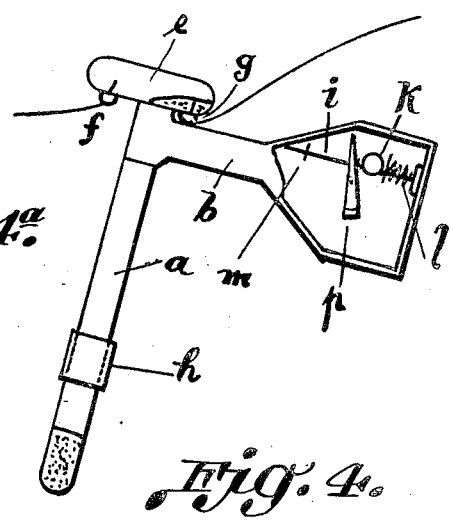
Figure 3:
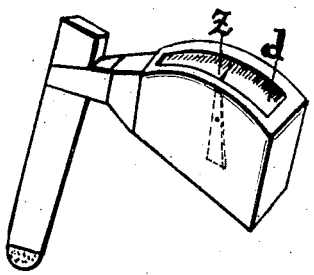

In the accompanying drawings are shown by way of example several embodiments of the invention. In said drawings:

Fig. 1 is a view in elevation of a hydrometer constructed in accordance with the present invention and immersed in a liquid; Fig. 2 illustrates a hydrometer having a modified form of scale; Fig. 3 shows a hydrometer having an edgewise scale adapted to be read from above; Fig. 4 shows a still further modification; Fig. 4a is a modified form of a detail of Fig. 4 on an enlarged scale; and Figs 5 to 7 show other embodiments of the inventive idea.

In Fig. 1 the letter $a$ indicates an ordinary hydrometer float comprising a sealed tube weighted at the bottom. An arm $b$ is attached to the hydrometer adjacent to the upper end of the latter and supports a pointer $z$ pivoted upon a pin $c$. The pointer plays over a scale $d$ fixed upon the arm $b$ and calibrated to indicate density. When the float is immersed in a liquid it will assume a tilted position because of the weight of the arm $b$ and of the parts mounted on the latter. The degree of inclination of the hydrometer will depend upon the density of the liquid in the vessel, the greater the density the greater the tilting or the smaller the angle which the hydrometer float makes with the horizontal.

Fig. 2 shows an arrangement in which the pointer and scale are mounted within a casing $d'$.

In the construction shown in Fig. 3 the pointer $z$ extends horizontally and is adapted to play over a scale $d$ which can be read from above.

In the embodiment of the invention illustrated in Fig. 4, the hydrometer is provided with a switch, such as a mercury switch $e$ having contacts $f$ and $g$. The contact $f$ may be connected to an electrode $h$ attached to the hydrometer tube. The mercury switch tube is attached in any suitable manner to the floating body or tube $a$, as shown in the drawing, and not to the arm $b$, so that the shifting of the mercury will not appreciably influence the measurement. The influence of the mass of mercury may, however, be completely counteracted by means of the following mechanism: A guide rail $i$ is mounted on the arm $b$ and supports a weight $k$ adjustable therealong. The weight $k$ is urged toward an abutment $m$ by a spring $l$. The pressure of the spring is opposed by a pivoted pointer-pendulum $p$. The pointer may take the form of a projecting lug or of a cam $u$ (Fig. 4a) whose curve is so determined that for every position of the mercury mass there corresponds a definite position of the equalizing weight $k$. The equalizing mechanism may be positioned within a casing, as shown. It may also be positioned in reverse order. The mercury tube may have a plurality of contacts and switch positions, so that different values may be indicated at a distant station.

Where the temperature of the liquid whose density is to be measured is too high to permit the use of mercury, I may use, in place of the mercury switch, a reversible or tilting switch having a contact ball running in a track.

The several arrangements may also be used below the surface of the liquid being tested, so that the specific gravity at greater depths may also be measured. In order to render the positions of the pointer readable, the arm $b$ must be lengthened upwardly so that the scale projects above the surface of the liquid.

By means of the switch associated with the hydrometer, as shown for example in Fig. 4, it is possible to indicate with the aid of electrical means the specific gravity of the liquid by employing electrical measuring instruments whose scales are suitably calibrated. In place of the usual electrical measuring instruments, I may employ recording instruments of any suitable type, so that the variations in specific gravity over any desired period may be automatically recorded. The pointer $p$ of Fig. 4 may cooperate with a scale on the cover or casing as shown in Fig. 2.

If desired, optical or acoustic signals may be set into operation when the specific gravity of a liquid reaches predetermined limiting values. It is often necessary to vary the specific gravity of a liquid by conducting an electric current therethrough. This current can be readily started or stopped automatically by means of the switch of the hydrometer. If this current is so large that the switches on the hydrometer can not safely or properly perform the switching operations, the latter may be accomplished by means of intermediate switches of relays or electromagnetic remote. According to the end in view, closed circuit or open circuit connections may be used.

The switches may also be employed to control check or other valves or pumps which feed a liquid of any kind into a mixing vessel. In this manner the specific gravity of a liquid can be automatically maintained constant.

Compensation or equalization of errors due to rapid fluctuations in the specific gravity of a liquid can be accomplished with the aid of a single hydrometer by using a so-called retarding relay. The several arrangements described hereinabove can be made to operate beneath the surface of the liquid by suitably encasing the same and are independent of the heat or acid content of the liquid.

In this manner it is possible to determine whether a liquid boils or not, whether the liquid surface is exceeded, whether a fluid freezes and whether the liquid has been boiled out of the vessel. Under certain circumstances the change in the state of aggregation can thus be indicated.

I wish it to be understood that the invention is not limited to any specific construction or embodiment and that variations from the specific forms shown or described may be resorted to within the scope of the appended claims without departing from the spirit of the invention.

Fig. 5 shows a hydrometer provided with a mercury switch which is electrically connected with a battery 11 and a bell 12. The body of mercury is so proportioned and the two contacts of the switch are so arranged that when a predetermined density is reached, the circuit is closed and the bell gives the alarm.

In the embodiment illustrated in Fig. 6, the hydrometer is connected to load switch De-relay 13 in circuit with a battery 11. Depending on the position of the switch 14, the relay 13 is connected in an idle or in a working current circuit. The relay 13 operates to connect or disconnect a motor 24 to power lines 27. The motor may be arranged to control a pump or a check valve for a liquid which changes the specific gravity of another liquid whose density is to be controlled; for example, the liquid contained in the vessel 26. To eliminate one of the conductors, one of the contacts of the switch may be connected with the electrode 15. The current then flows from 15 to an electrode 16. The apparatus shown in Fig. 6 may be employed in electrolysis in which an electric current produces changes in the condition of a liquid.

Fig. 6a shows a retarding relay which may be substituted for the relay shown in Fig. 6 and comprises a plunger 17 movable in a cylinder 18 containing oil and operating in well-known manner.

Fig. 7 shows a ball switch 19 comprising a closed tube 20 of insulating material provided with contacts 21 along one side and with a contact rail 22 along the opposite side of the tube. A metal ball 23 makes contact with the rail and with the contacts 21 in succession. The rail and contacts may be connected to a battery 11 and to one or more relays or to an indicating instrument 25.

Variations may be resorted to within the scope of the appended claims without departing from the spirit of the invention.

I claim:

1. A hydrometer comprising a float of elongated form adapted to float freely without support in a liquid and weighted at its bottom and of such length that the immersed portion is always of greater weight than the portion above the level of the liquid to be tested, an arm attached to said float near the upper end of the latter and arranged to cause said float to be inclined to the vertical when immersed in a liquid, a scale carried by said arm and a weighted pointer pivoted on said arm and cooperating with said scale.

2. A hydrometer comprising a float of elongated form adapted to float freely without support in a liquid and weighted at its bottom end and of such length that the immersed portion is always of greater weight than the portion above the level of the liquid to be tested, a lateral arm extending from said float at the upper portion of the latter, the center of gravity of the hydrometer being so located that the hydrometer float assumes inclined positions when immersed in liquids of different specific gravities, and means for indicating the degree of inclination of said float and including an element movable relatively to the float, and adapted to assume different positions relatively thereto as the inclination of said float varies.

3. A hydrometer comprising a float of elongated form adapted to float freely without support in a liquid and weighted at its bottom end and of such length that the immersed portion is always of greater weight than the portion above the level of the liquid to be tested, said float having an arm extending laterally therefrom so that said float assumes an inclined position when immersed in a liquid, the degree of inclination depending on the density of the liquid, an indicating mechanism supported by said float for indicating the inclined position of the float, the indicating or controlling element of said indicating mechanism being adapted to assume different positions relatively thereto as the inclination of said float varies.

4. A hydrometer comprising a float of elongated form adapted to float freely without support in a liquid and weighted at its bottom and of such length that the immersed portion is always of greater weight than the portion above the level of the liquid to be tested, such float being eccentrically weighted so that it assumes an inclined position when immersed in a liquid, and means for indicating the degree of inclination of said float, and including an element movable relatively to the float and adapted to assume different positions relatively thereto as the inclination of said float varies.

Signed at Berlin, Germany, this 17th day of August, A. D. 1929.

RICHARD SCHRÖDER.